(12) United States Patent
Mossinkoff et al.

(10) Patent No.: US 11,114,101 B2
(45) Date of Patent: Sep. 7, 2021

(54) SPEECH RECOGNITION WITH IMAGE SIGNAL

(71) Applicant: IEBM B.V., The Hague (NL)

(72) Inventors: Olaf Petrus Quirinus Mossinkoff, The Hague (NL); Johannes Leonardus Jozef Meijer, Haarlem (NL)

(73) Assignee: IEBM B.V., The Hague (NL)

( * ) Notice: Subject to any disclaimer, the term of this patent is extended or adjusted under 35 U.S.C. 154(b) by 0 days.

(21) Appl. No.: 16/962,734

(22) PCT Filed: Jan. 25, 2019

(86) PCT No.: PCT/IB2019/050626
§ 371 (c)(1),
(2) Date: Jul. 16, 2020

(87) PCT Pub. No.: WO2019/150234
PCT Pub. Date: Aug. 8, 2019

(65) Prior Publication Data
US 2020/0357407 A1    Nov. 12, 2020

(30) Foreign Application Priority Data

Jan. 31, 2018   (NL) ...................................... 2020358
Jun. 1, 2018    (NL) ...................................... 2021041

(51) Int. Cl.
*G10L 15/25*    (2013.01)
*G10L 15/22*    (2006.01)
(Continued)

(52) U.S. Cl.
CPC .............. *G10L 15/25* (2013.01); *G10L 15/22* (2013.01); *H04N 5/2256* (2013.01); *H04N 5/23219* (2013.01); *G10L 2015/223* (2013.01)

(58) Field of Classification Search
CPC ... G10L 15/22; G10L 15/25; G10L 2015/223; H04N 5/2256; H04N 5/23219
See application file for complete search history.

(56) References Cited

U.S. PATENT DOCUMENTS 4,757,541 A    7/1988   Beadles
5,473,726 A    12/1995  Marshall
(Continued)

FOREIGN PATENT DOCUMENTS

WO         9729481 A1    8/1997

OTHER PUBLICATIONS

Duchnowski et al., "See me, Hear me: Integrating Automatic Speech Recognition and Lip-Reading" ICSLP 94: 1994 International Conference on Spoken Language Processing. Yokohama, Japan, Sep. 18-22, 1994.
(Continued)

*Primary Examiner* — Angela A Armstrong
(74) *Attorney, Agent, or Firm* — Kacvinsky Daisak Bluni PLLC

(57) ABSTRACT

A method of speech recognition and person identification based thereon, comprising: recording speech from a speech signal using a microphone; illuminating a speaking mouth; recording a degree of light reflected by the mouth from a reflection signal using a sensor; and recording combined parameters of the speech signal and of the reflection signal, and coupling them to letters associated therewith, per predetermined time duration; comparing a combination occurring in speech of parameters of the speech signal and of the reflection signal to the recorded combined parameters of the speech signal and of the reflection signal which are coupled to letters; and deciding on the basis of the comparison to which letter the combination occurring in the speech of parameters of the speech signal and of the reflection signal (Continued)

corresponds, using block-width modulation of the reflection signal.

11 Claims, 14 Drawing Sheets

(51) Int. Cl.
*H04N 5/225* (2006.01)
*H04N 5/232* (2006.01)

(56) References Cited

U.S. PATENT DOCUMENTS

| | | | | |
|---|---|---|---|---|
| 5,687,280 | A * | 11/1997 | Matsui | G06K 9/00268 |
| | | | | 704/231 |
| 6,272,466 | B1 * | 8/2001 | Harada | G06K 9/00221 |
| | | | | 704/270 |
| 7,860,718 | B2 * | 12/2010 | Lee | G10L 25/87 |
| | | | | 704/276 |
| 9,424,842 | B2 * | 8/2016 | Liu | G10L 15/08 |
| 2014/0276247 | A1 * | 9/2014 | Hall | A61N 1/3603 |
| | | | | 601/2 |

OTHER PUBLICATIONS

Liu Z et al., "Classification TV programs based on audio information using hidden Markov model" Multimedia Signal Processing, 1998 IEEE Second Workshop on Redondo Beach, CA, USA Dec. 7-9, 1998.

International Search Report and Written Opinion for the International Patent Application No. PCT/IB2019/050626, dated May 15, 2019, 12 pages.

* cited by examiner

SPEECH RECOGNITION WITH IMAGE SIGNAL

This is a national stage application filed under 35 U.S.C. § 371 of pending international application PCT/IB2019/050626, filed Jan. 25, 2019, which claims priority to Netherlands Patent Application No. NL 2020358, filed Jan. 31, 2018, and Netherlands Patent Application No. NL2021041, filed Jun. 1, 2018, the entirety of which applications are hereby incorporated by reference herein.

The present disclosure relates to speech recognition on the basis of recording speech from a speech signal using a microphone; illuminating a speaking mouth; and recording imagery of a speaking mouth. In the past, it was assumed possible to recognise speech from the recorded sound and image signals. On the basis of the speech recognition it is possible to generate written text, enter commands into systems such as computers and mobile phones, and so on.

Such a method is for instance known from U.S. Pat. Nos. 3,383,466, 3,192,321 and 5,666,400. These known methods and systems based thereon are however inadequate in respect of reliable and accurate speech recognition and/or person identification. Further, reference is made here to WO-97/29481 which is acknowledged as the closest prior art, relative to which the present disclosure is distinguished at least by feature defined in the characterising portion of the appended independent main claim.

With the present disclosure the inventors intend to provide an improved method which enables more accurate and more reliable speech recognition. The present method is distinguished for this purpose by the measures of: recording a degree of light reflected by the mouth from a reflection signal using a sensor; recording combined parameters of the speech signal and of the reflection signal, and coupling them to letters associated therewith, per predetermined time duration; comparing a combination occurring in speech of parameters of the speech signal and of the reflection signal to the recorded combined parameters of the speech signal and of the reflection signal which are coupled to letters; and deciding on the basis of the comparison to which letter the combination occurring in the speech of parameters of the speech signal and of the reflection signal corresponds. The method further comprises the step of block width modulation of the reflection signal. Through features of the appended main claim in combination, a more reliable and accurate speech recognition and/or person identification are realized.

The method can comprise the step that the parameter of the speech signal is taken from a group comprising within the predetermined time duration at least: volume dispersion of a difference between a highest and a lowest value of a volume of the speech signal; and a ratio of sound of the speech signal within and outside a noise level (signal-to-noise ratio). Such a step may be advantageous or beneficial, even without the step of block width modulation of the reflection signal.

The method can comprise the additional or alternative step that the parameter of the reflection signal is taken from a group comprising within the predetermined time duration at least: an average of the reflection signal; and a degree of increase or decrease of the reflection signal. Such a step may be advantageous or beneficial, even without the step of block width modulation of the reflection signal.

In an embodiment wherein the parameter of the reflection signal is taken from a group comprising within the predetermined time duration at least: an average of the reflection signal; and a degree of increase or decrease of the reflection signal, and the reflection signal has optionally been block-width modulated, the method can further comprise of determining the average of the reflection signal as an average over the predetermined time duration of half the block duration of the block wave. Such a step may be advantageous or beneficial, even without the step of block width modulation of the reflection signal.

The method can comprise the additional or alternative step of determining the degree of increase or decrease of the reflection signal as a measurement in degrees. Such a step may be advantageous or beneficial, with or even without the step of block width modulation of the reflection signal and/or camera images.

The method can comprise the additional or alternative step that the predetermined time duration is 1, 2, 3, 4 or 5 milliseconds. Such a step may be advantageous or beneficial, even without the step of block width modulation of the reflection signal.

The method can comprise the additional or alternative step of subdividing the speech signal into portions corresponding to letters, and indicating at least one of: starting and ending times of letters in the speech signal; and time durations expressed in numbers of times the shortest duration, which is defined by the frequency of for instance 88.200 Hz. Such a step may be advantageous or beneficial, even without the step of block width modulation of the reflection signal.

The method can comprise the additional or alternative step of determining maxima and minima of the reflection signal, and normalizing the reflection signal on the basis of the maxima and minima Such a step may be advantageous or beneficial, even without the step of block width modulation of the reflection signal.

The method can comprise the additional or alternative step of: forming, on the basis of the decision of which letter the combination occurring in the speech of parameters of the speech signal and of the reflection signal corresponds to, a preselection of potential subsequent letters. Such a step may be advantageous or beneficial, even without the step of block width modulation of the reflection signal.

The method can comprise the alternative or additional step of: synchronously registering speech and registering a degree of light reflected by the mouth in the reflection signal. Such a step may be advantageous or beneficial, even without the step of block width modulation of the reflection signal.

The method can comprise the alternative or additional step of: person recognition based on recognition from the speech signal and the reflection signal of viseme and phoneme combinations. Such a step may be advantageous or beneficial, even without the step of block width modulation of the reflection signal.

After the foregoing discussion of features according to the present disclosure in terms according to the appended claims, a more detailed yet non-limitative description of aspects thereof follows below. In the drawing:

Figure 1:
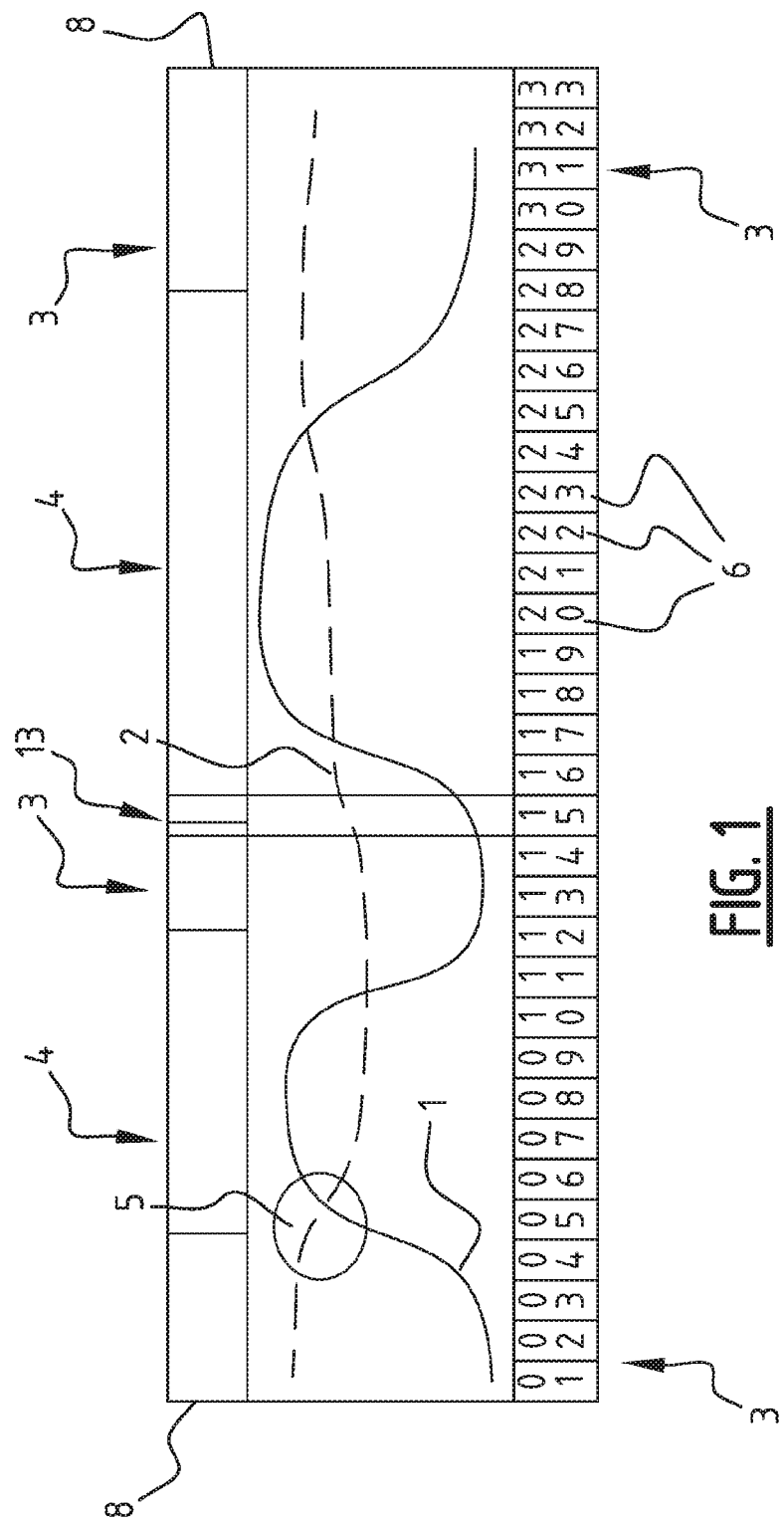
FIGS. 1-5 show graphs of speech and image signals recorded in conjunction.
Figure 2:
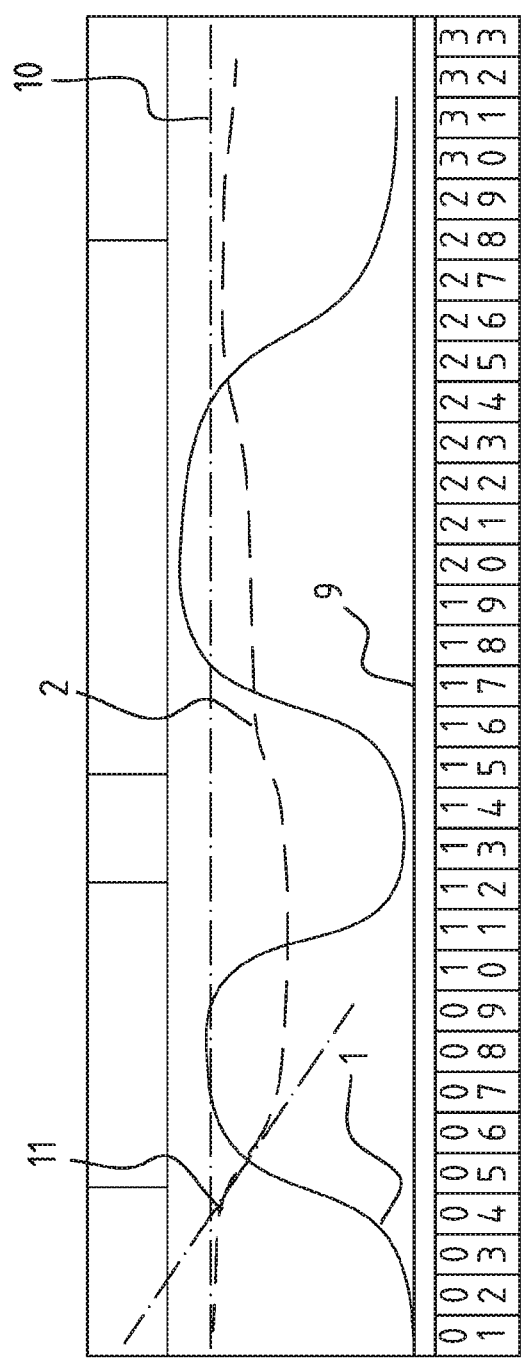

FIGS. 1-5 show graphs of combined image and sound signals. Recorded on one of the stereo sound tracks in addition to the mono speech sound is a signal resembling a block wave which comprises information about the intensity of the light from a lamp directed at the mouth, in this case a direct current lamp, which is reflected by the mouth. Without illumination or ambient light the system does not work, when the mouth is illuminated without ambient light the system operates optimally due to the absence of noise caused by background light, and in further embodiments it may be possible to suffice with ambient light alone, i.e. without a lamp directed at the mouth.

During the letter A the mouth is open and the light reflection is minimal, and during the letter M the mouth is closed and the light reflection is maximal. The other letters and letter combinations of the alphabet lie there between. During the letter N the mouth is opened slightly, which produces less light reflection than the letter M. The idea is that the mouth position (area of and around the lips) is an indicator of that which is being said, wherein the viseme (mouth position) is formed slightly before the phoneme (the letter sound). Analysing the mouth movement in combination with that which is being said results in speech image recognition.

During a training process the characteristic of a phoneme and phoneme combinations can be stored in the letter collection so as to later recognize corresponding moments from speech.

Recording Quality

Recording Quality of the Image

Recording of speech image takes place by means of block-width modulation (BWM) of the light intensity in the audible spectrum. When speech sound is recorded at 88.200 Hz and processed into index numbers of this measurement, the smallest unit is 1 millisecond and is referred to as a split.

The light measurement of reflection of DC light on lips and the part of the surrounding skin around the mouth is higher when the mouth is closed than when the mouth is open, and the reflection is lower. Background light from alternating current lamps with a mains frequency of 50 or 60 Hz is undesirable here. No light preferably comes from behind the speaker. Daylight variation is further taken into consideration. Random peaks indeed move the maximum, and changes in sunlight and slow cloud shadows move the minimum. The sensor is not placed directly opposite the mouth due to possible formation of condensation and thermal effect due to the breath.

Recording Quality of the Sound

Signal analysis with Fourier transformation of 21 successive values and smoothed into 3 values: first, median and final value, is applied to the speech sound. The sound file is thereby reduced from 88.200 to 12.600 kilohertz. Routines for utilizing fast Fourier transformation are known to the skilled person, but had not yet been tested at the time of formulation of this disclosure. Fourier transformation searches for sine waves, as opposed to the block waves in the fast Fourier transformation applied here, which knows only powers of two as value length. In the case of 512 values the frequency spectrum ranges from 24 to 6300 hertz. The phase is thus also fully known for speech frequencies of 48-3150 hertz.

Four Variables as Building Blocks

A number of variables can be calculated from measurement data as shown schematically in graphs of FIGS. 1-5:

1. Image recording: half the block duration of the block wave of the sensor is averaged over a millisecond, designated in Violin5 with the letter "b";

2. Image phase: in degrees, 0 is the maximum, 90 a decrease, 180 the minimum and 270 an increase in steps of 5 degrees, designated in Violin5 with the letters "bf".

3. Volume dispersion: the difference between the highest and lowest value of sound in the millisecond, designated in Violin5 with the letter "v";

4. Percentage: percentual ratio of sound within and outside a noise level (signal-to-noise ratio), designated in Violin5 with the letter "p".

FIGS. 1-5 show characteristics of a sound or speech signal 1 recorded with a microphone and an image signal 2 recorded with a camera. In these figures the speech signal and the image signal are synchronized so that the present mouth position can indicate an imminent determined sound or phoneme.

The image signal is associated with a degree of reflection of light by and around the mouth, and thus with a mouth position. A level 10 light reflection can indicate a maximum or a minimum. The degree to which the mouth opens less or more is associated with articulated sounds, which can thereby be traced back to letters. A transition 5 in the mouth position in FIGS. 1 and 2 can for instance be detected on the basis of a tangent line 11 or a bend line against the path of the graph of image signal 2, where a transition between mouth positions can be opted for when tangent line 11 is an intersecting line or bend line. The tangent line is a measure of the increase or decrease characteristic of image signal 2.

A weak sound signal 1 at or just above noise floor 9, which is indicative of background noise, indicates silence and/or spaces 3, and a strong sound signal is indicative of words 4 being spoken.

In the time between a start 7 of a recording and an end 8 thereof the representation of speech signals 1 and image signals 2 is divided into mutually equal time periods, and each time period is designated as a split 6. These splits 6 each comprise a period of for instance 1 millisecond, or a (small) multiple thereof, and are successively numbered in FIGS. 1-5.

Figure 4:
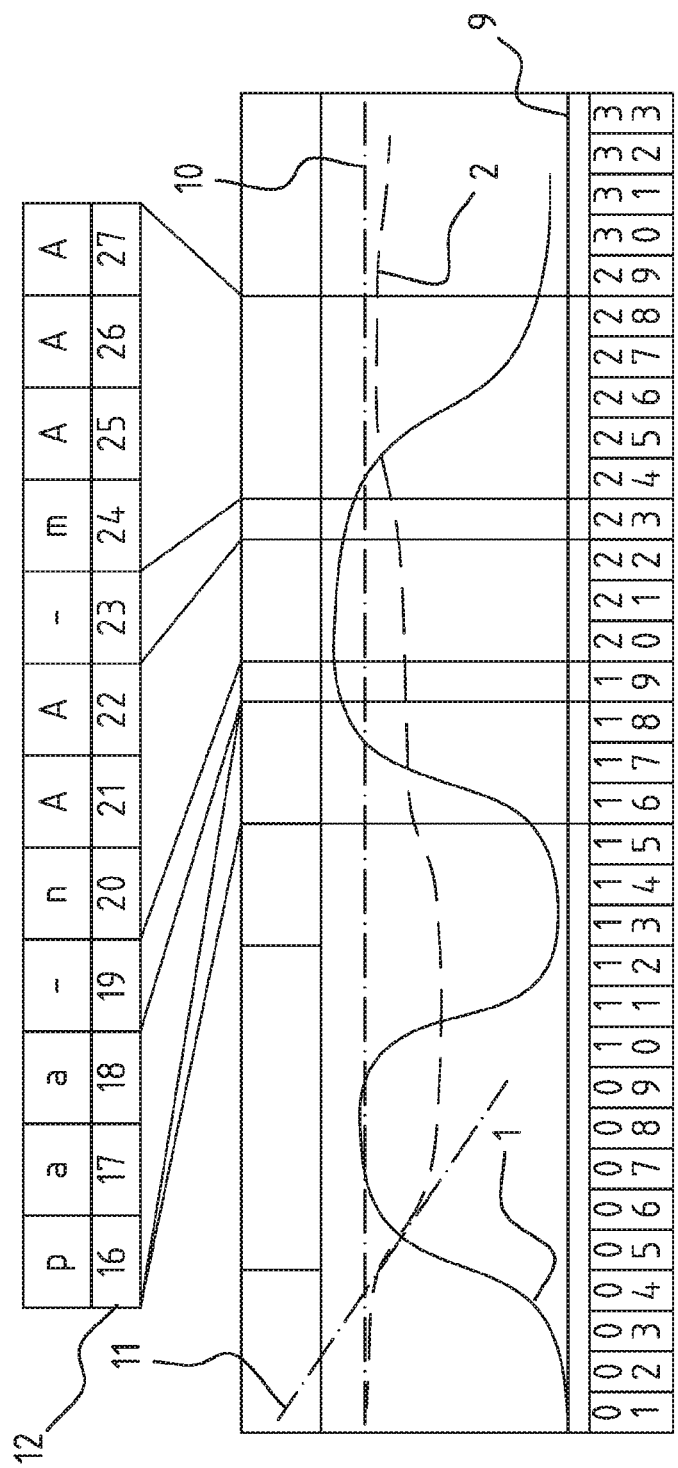
Figure 5:
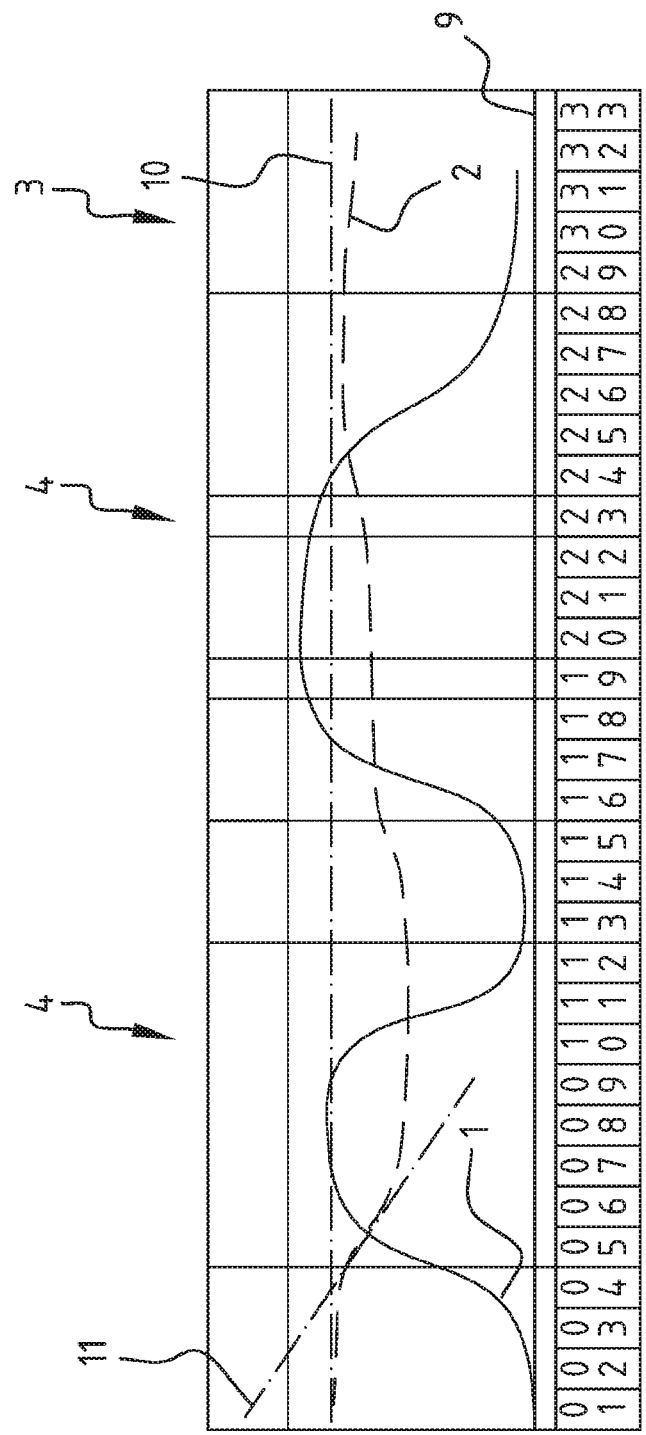
Figure 6:
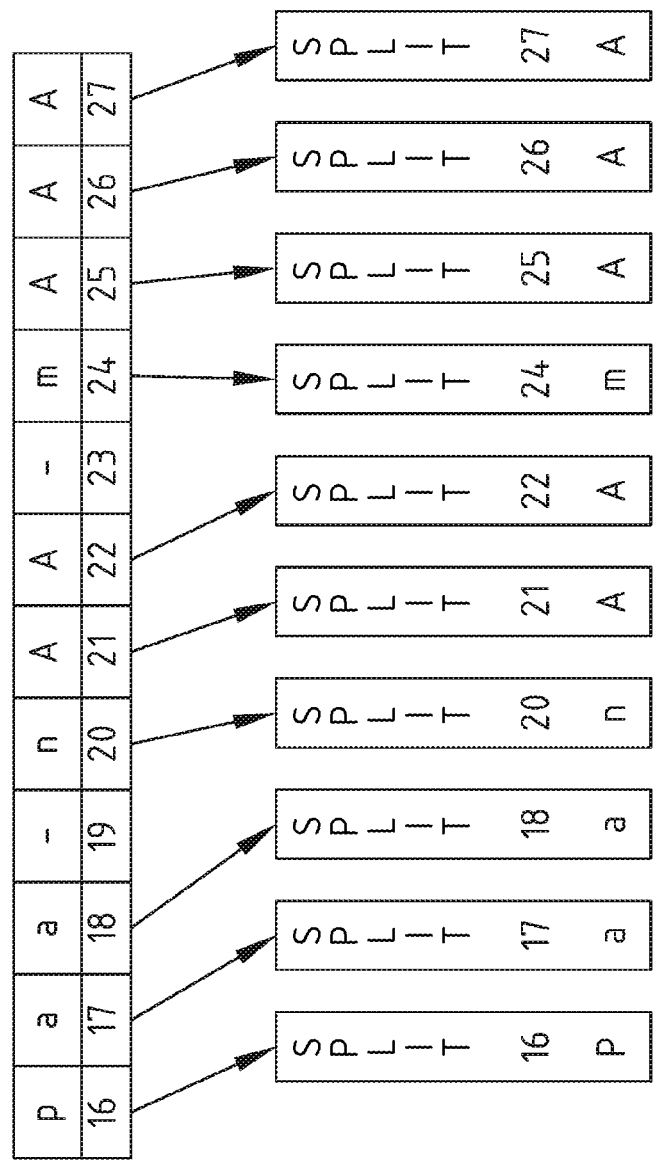
FIG. 6 shows a part of the graph of FIG. 5 and conversion into text in more detail.

Speech recognition can be limited to periods or fields of recognition with speech 4, between splits four and thirteen and between splits fifteen and twenty-nine, while silences and/or spaces 3 can be ignored. FIGS. 4 and 6 show how a period from the sixteenth split 6 up to and including the twenty-eighth split 6 is highlighted. Data of said four variables, which result in metadata after the training phase/karaoke, are recorded for each millisecond or split 6 and for each phoneme or sound.

The data of the increase/decrease characteristic in the image signal and the average, minimum and maximum values of the speech signal are recorded for each split 6.

The starting and ending times are recorded for each sound or phoneme, which can take up one or more than one split 6. In a training phase the average durations of phonemes or sounds can be recorded, or these can be adjusted in practice.

An average value and a maximum and a minimum of the image signal 2 are further determined for each phoneme, as well as an average value of the orientation of tangent line 11, which is also referred to here as the image phase and/or the increase/decrease characteristic in the image signal. This can be done with any desired accuracy, and it has been found that a precision rounded off to multiples of 5 degrees can suffice for very reliable and accurate speech recognition.

The average, maximum and minimum of the volume is recorded from speech signal 1 for each phoneme or sound, and further also the percentage, which represents a percentual ratio of sound outside and within a noise level. 11 metadata are thus recorded for each phoneme, as well as metadata for transitions between phonemes, which results in a total number of 22. The starting time 12 in the succession of splits 6, when a word begins, is recorded, for instance on the basis of the number of the first split 6, in the case of FIGS. 4 and 6 therefore the sixteenth split. The same can apply to other points in time, such as beginning and end of phonemes/sounds, and so on.

After a silence or space in which a mouth position stabilizes, a strongly inclining position of tangent line 11 is an indication that speech is beginning. Between splits four and five and between splits fifteen and sixteen a change in mouth position is thus indicative of the start of a new word.

The image phase is recorded in steps of 5 degrees and provides information about the tangent line against the graph of the average half block duration, and thus the degree of increase or decrease. In the case of a closed mouth there is a lot of reflection and the average half block duration is short; this is characteristic for for instance the letters b, m and n. In the case of an open mouth there is less reflection and the average half block duration is long; this is characteristic for the letters a and e.

A whole block is a time section 1 and a time section 0. The sensor is symmetrical so that section 1 and section 0 comprise the same information and have (approximately) the same duration, this making half the block duration (section 1 or section 0) the smallest information carrier.

The image phase is obtained by smoothing the graph of f(t) (averaging over three successive points f'(t)=(f(0)+f(1)+f(2))/3) and marking the minima and maxima and inflection points and having the phase increase gradually (or in steps of 5 degrees) therebetween. This provides information from the PWM signal f(t).

When half the block duration is short (in the case of a lot of reflection), the frequency of the tone of the image violin is high and, when half the block duration is long, the frequency is low. During programming, it is preferred to work with half the block width.

In order to obtain an equidistant time curve half the block duration is averaged over a standard time interval of 1 millisecond. Other time intervals are also possible, for instance 5 milliseconds, or longer or shorter, for which reference is made here to FIG. 15. To be precise, the number of half block durations in the time step is counted and the time step divided by this number is calculated. This then becomes the measure for the amount of reflected light.

Preparation First Recording
Definitions

Viseme is an image component of a word in a language. Phoneme is a sound component of a word in speech. Letter collection: metadata of a letter or phoneme combination with the mouth position associated therewith and the mouth position preceding it. The metadata are the average of the four parameters and their standard deviation and their minimum and maximum.

Determining Predetermined Text

Predetermined text is the selection of words with particular letter/phoneme combinations. The object of the predetermined text is to accelerate the analysis process, such as image pattern preceding phoneme. Of the 26 times 26 letter combinations, about 30% occurs, approximately 240 combinations. From these, it is possible to choose a minimum number of words, so that the text comprises every existing phoneme combination at least once in order to achieve completeness of the letter collection. These words are put in an associated order. In this disclosure use is made of the predetermined text "pA mA nA panAmA" (phonetically, short phonemes are written as lowercase letters, and diphthongs or long phonemes are represented in capital letters).

Writing Out Phonetically

Writing the text out phonetically provides a script for the recording in order to thereby be able to fill the letter collection, and then be able to compare subsequent recordings thereto on the basis of such recordings or to be able to compare them in real time to sound and image recordings (without storage).

Setting Equipment
Light Intensity

Determined here are the highest and lowest values of the light intensity which is reflected by the mouth by articulating and measuring the letter M (closed mouth gives maximal reflection and minimal block duration) and the letter A (opened mouth gives minimal reflection and maximal block duration). This is used for standardizing, whereby the image number remains within a vertical screen resolution.

Measuring Range

It is checked here, for instance using a mirror, whether the light sensor records the mouth movements of the lips (the opened mouth must also fall within the measuring range).

Sound Volume

The recording sensitivity is here adjusted to the average speech volume, wherein the maximum should only just be able to result in signal distortion.

Music Sampling

In the recording, sound fields are marked by indicating points in time. The marked field between two points in time consists of a word, space or a phoneme (within a word).

Recognition

There are two forms of recognition:

1. Field recognition of field 14 is shown schematically in FIG. 3 of predetermined text (pre-known text), also referred to as karaoke/lettering, from which the metadata can be determined, for instance during training. Karaoke entails precisely indicating the points in time at which phonemes transition into each other. This can be manual field recognition. The average for the metadata is determined over these fields, and the most suitable split is then searched for with the least squares method, which split in turn determines the minimum and maximum in the metadata.

2. Split recognition is also designated for split 15 in FIG. 3, and serves for recognition of spontaneous text, wherein it is not known beforehand what the speaker will say.

Average Duration

Since consonants are not are not all the same length and vowels are moreover variable in terms of duration, a starting and ending time will have to be given per phoneme, from which an average results for each phoneme, which is used for a process which is referred to as zipping. This is shown in FIG. 4.

Field Recognition for Karaoke

Moments characteristic for the variable phoneme length are shown as inflection points in the image phase (the minimum, median value or maximum) and form the index numbers for letter transitions. By removing spaces from the sound, whole words can be 'zipped' together. The starting times are adapted by zipping. The whole file has a known duration, so the letter at the halfway point must be correct: by determining the starting time of this letter, a part stretches out and a part is compressed in time: this is called zipping with the bisection method.

Determining Metadata

Based on the splits falling within a phoneme field the variables for the metadata are averaged (see table in FIG. 6). A drawback of split averages is that there may not be a split which has a determined value. This is why the least squares method is used; the split lying closest to the average is utilized. These provide minimum and maximum. It is possible to determine for each split whether the variables fall within the extremes of a phoneme or not. This is shown schematically in FIG. 6.

Unique, Multi- and Void Splits

Comparing the splits from the spontaneous text to the metadata of the predetermined text (particularly the minimum and maximum) results in three possibilities: the spontaneous split corresponds to only one (unique) phoneme, to multiple (multi-)phonemes, and there are no (zero) hits.

1. Unique splits 13 occur once and can be correct or incorrect. If the A split 18 is compared to splits 22, 26 and 27 and the metadata are the same (because the mouth position A does not change following the prior A), this is a correct split.

2. Multi-splits result in a plurality of phonemes falling within the extremes, but are not characteristic enough for unique recognition. The split falls within the min/max range for multiple phonemes.

3. Void splits, wherein there is no phoneme for which the split falls between the extremes.

Least Squares

For each split there is a phoneme and two phoneme transitions (one on the left and one on the right) which is closest on the basis of least squares and therefore lies within the smallest (hyper-)cube encompassing the four variables of the split. In the case that a phoneme transition is found, two phonemes are being recognized simultaneously (the present and future phoneme in the case of recognition on the left and the present and past phoneme in the case of recognition on the right).

Nearest Neighbour Search

For each of the four above stated variables there is a phoneme which is the nearest neighbour, which results in four phonemes. If three correspond, this is the most likely phoneme.

Optimization of Split Recognition

The correct unique splits 13 are what result in speech recognition. If phonemes in a spontaneous text are not recognized, one or more components of the meta-data are incorrect. It is possible to then optimize the metadata such that the 'incorrect' unique splits or multi-splits become 'correct' unique splits.

This can be done in different ways:
  Move starting and ending times of karaoke and recalculate the letter collection;
  Adjust the min/max field for one of the variables in the letter collection;
  Have the variable with the greatest degree of distinction be decisive.

In the view in FIG. 7 of an interface to illustrate the working of a method according to the present disclosure, "Violin 5" on the line below the designations "Split perc vol increase decrease Violin5" shows the phonemes on the basis of karaoke from the predetermined text (image mouth reflection) for a single person, while in FIG. 14 these are shown for two people, which shows how reliable the method is, irrespective of the person speaking. The phonemes recognized on the basis of split recognition are further shown two lines below. The line of graph 16 is of the percentage (p). The line of graph 22 provides the image variable (b) of one phoneme (see also FIG. 13).

Diagram Speech Image 'Recognition' First/Predetermined Recording

Figure 8:
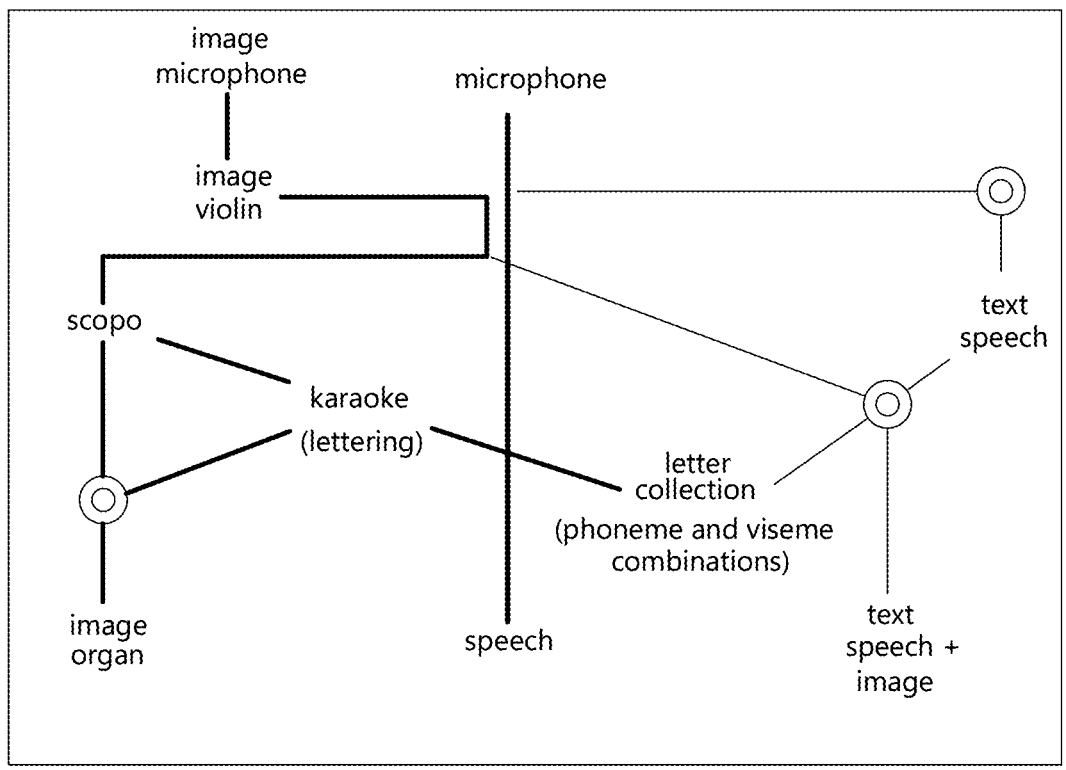
FIG. 8 shows a diagram of the training of a system as implementation of a method according to the present disclosure.

FIG. 8 shows schematically the method of training of the speech recognition, with pre-known text, also referred to here as predetermined text. As indicated in the description of FIG. 3, the emphasis here is on field recognition, and FIG. 8 adds that, for training of a system with predetermined text, the image recognition is emphasized.

Diagram Speech Image 'Recognition' Subsequent/Spontaneous Recordings

Figure 3:
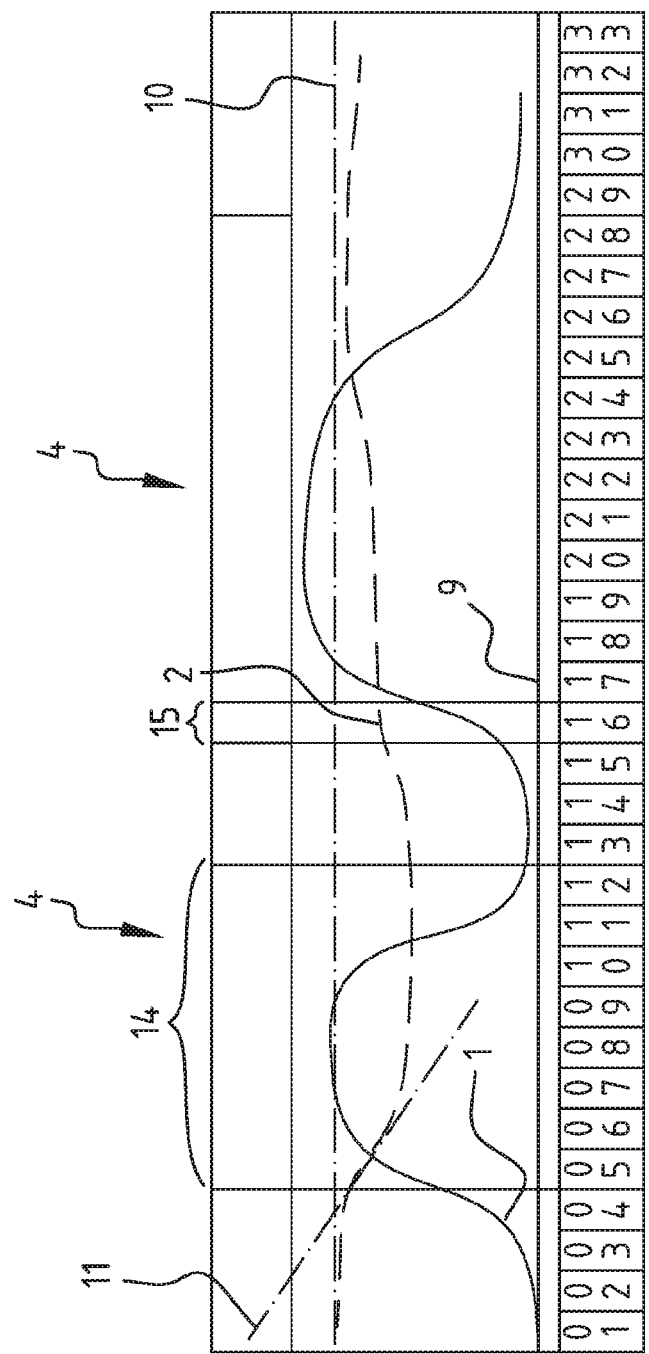
Figure 9:
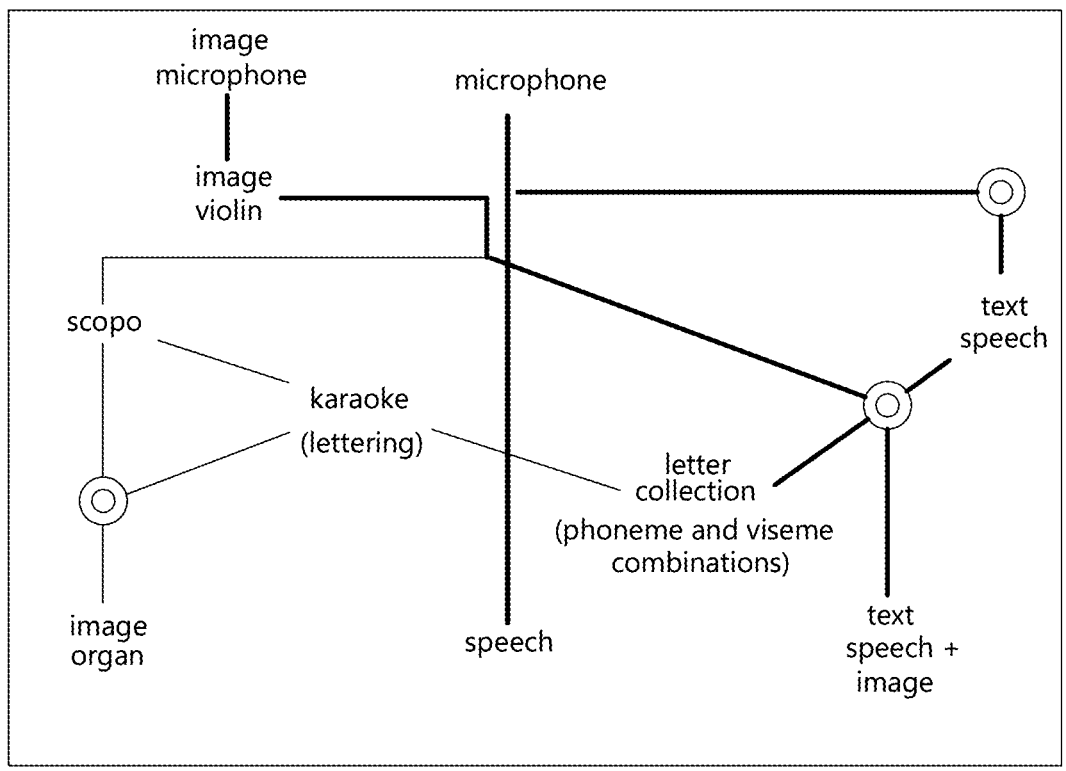
FIG. 9 shows a schematic view of speech recognition in practice.

In the case of spontaneous recognition, i.e. without pre-known text, shown schematically in FIG. 9, the emphasis is on splits as also indicated in FIG. 3, and thus the recorded speech or sound signal.

The following key is relates to FIGS. 8 and 9:

The image microphone is the headset with a lamp, (image) sensor and microphone directed at the mouth.

The image violin is the block-width modulated signal which is recorded on the second track.

Scopo is a designation for splits with data about the four variables:
  b—image
  fb—phase image
  o—percentage
  v—volume The designation karaoke stands for the points in time of the phoneme transitions in the articulated predetermined text.

The image organ indicates that when variable b changes, a harmonic piano tone corresponding to the variable b is briefly played.

Letter collection: metadata about the four variables per phoneme and phoneme transition.

The microphone serves for recording speech sound on the first track.

The speech itself is the sound recording in stereo at 88.200 hertz.

The designation spoken text stands for the preceding speech recognition with sound on the first track.

Spoken text+image is a designation for new speech recognition with sound and image on both tracks.

Applications Speech-Image Recognition

Figure 10:
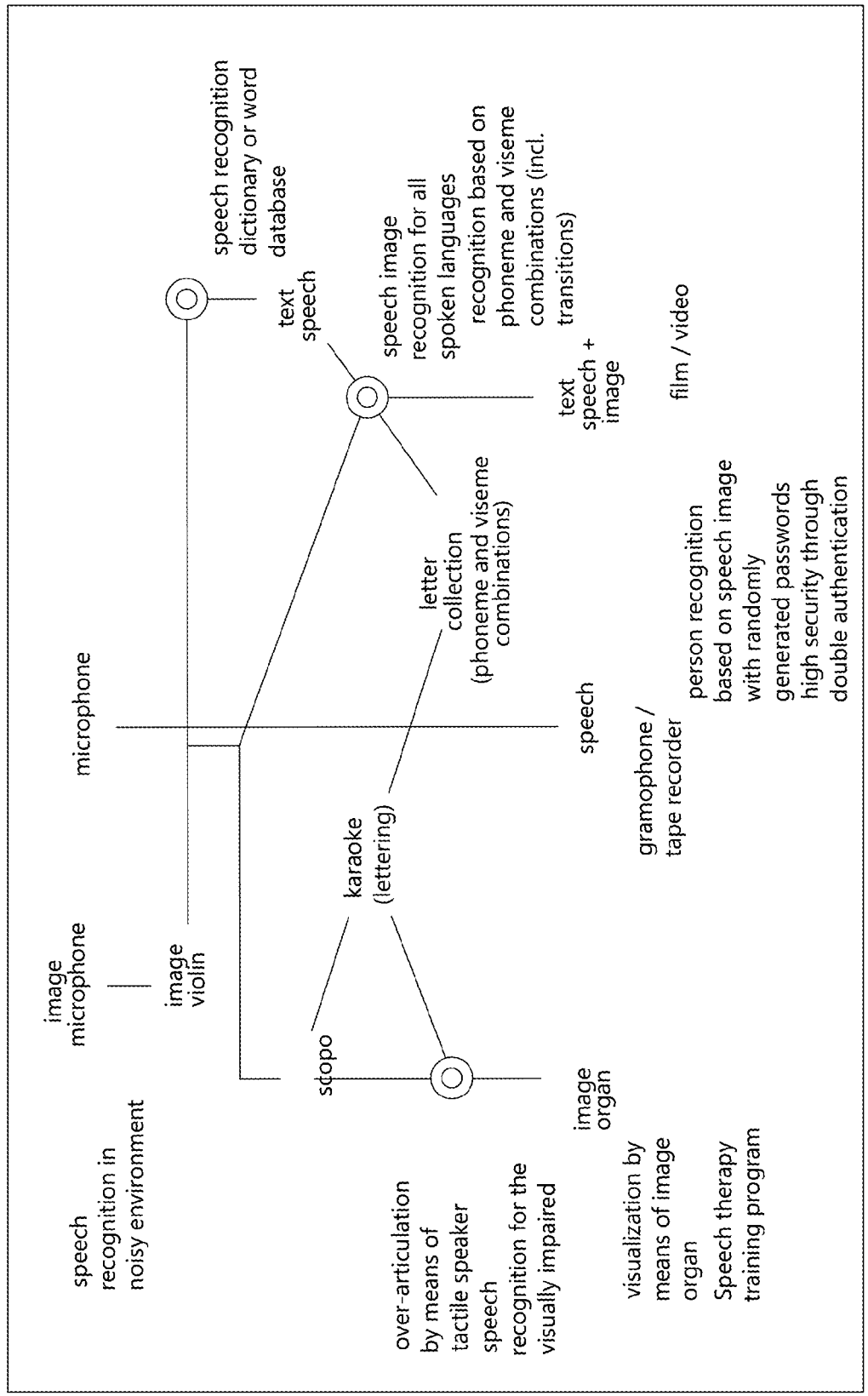
FIG. 10 shows a schematic view of possible applications of the present disclosure.

FIG. 10 gives an indication of various applications of the method according to the present disclosure, which can be inferred from diverse points in the diagram of FIGS. 8 and 9.

Such applications comprise:
  Tape recorder for recording on two tracks;
  Speech recognition on the basis of word prediction;
  Zoom sensor in film or video;
  Tactile speaker: speech movement for the visually impaired;
  Mouth reflection: speech visualization for the hearing-impaired;
  Image organ: speech therapy training program;
  Speech recognition in noisy environment;
  Image violin: recognition of all spoken languages; and Letter collection: person recognition for security purposes.

Further information about several such applications follows below.

Zoom Sensor in Film or Video

Figure 11:
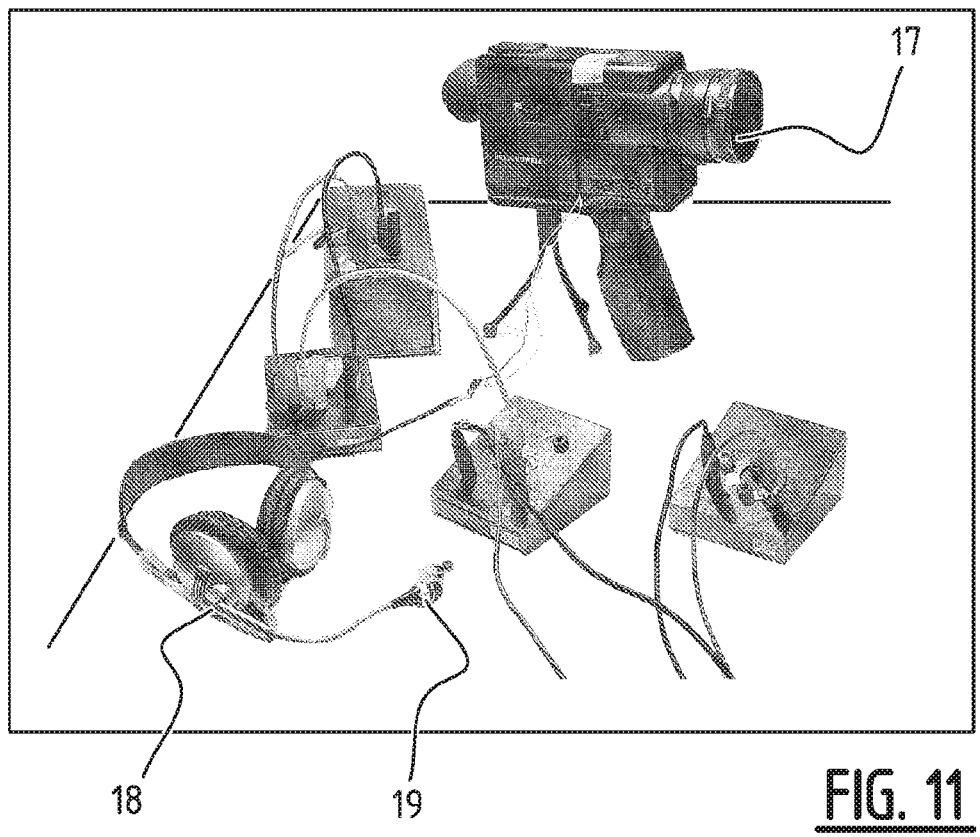
FIG. 11 shows a set-up of a system for implementation of a method according to the present disclosure.

Films or video with speakers can be dubbed correctly in respect of visemes by zooming in on the mouth of the face of a speaker in the film or video by means of a camera 17 (FIG. 11) with built-in image sensor. This can also be used for recognition of predetermined text or spontaneous text, together with headphones 18 with microphone 19, which are also shown in FIG. 11. The mutual connections are of lesser importance to the present disclosure, although a system according to this disclosure can comprise A/D converters for converting speech signal 1 and image signal 2 into digital or at least sampled form, or a system can take an analog form.

Tactile Speaker: Speech Movement for the Visually Impaired

Figure 12:
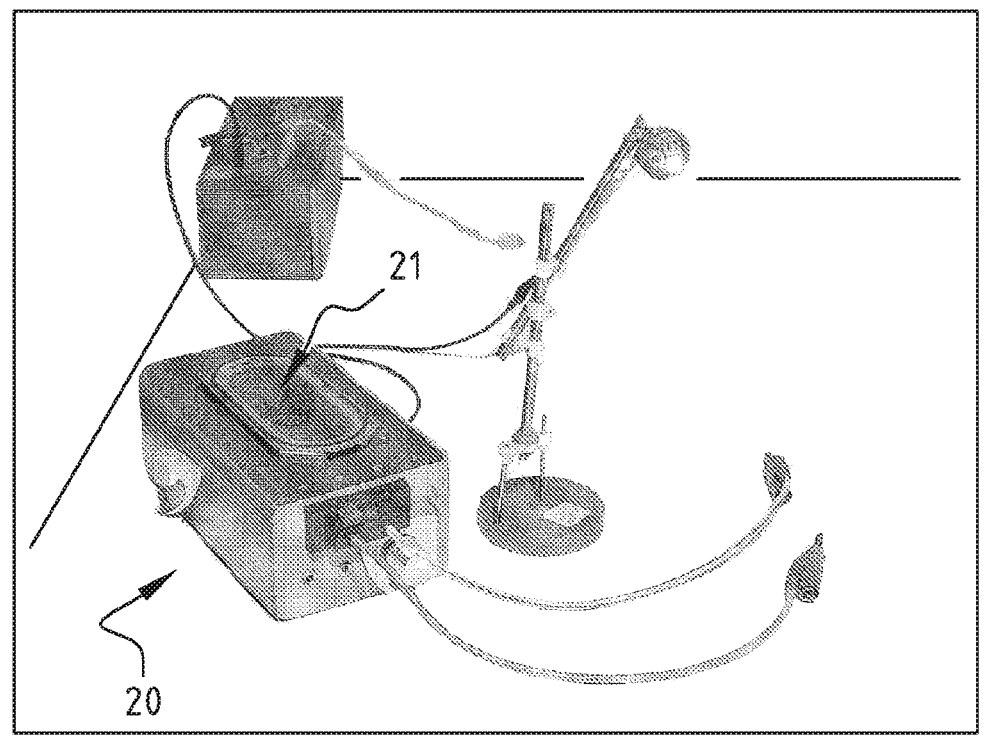
FIG. 12 shows a set-up of a system for implementation of a method according to the present disclosure.

The visually impaired can be aided by teaching them to use a tactile speaker 20. This is a speaker which allows movements or variations in image signal 2 to be felt at the end of an index finger on a cone 21 of a loudspeaker, as depicted in FIG. 12.

Mouth Reflection: Speech Visualization for the Hearing-Impaired

Figure 7:
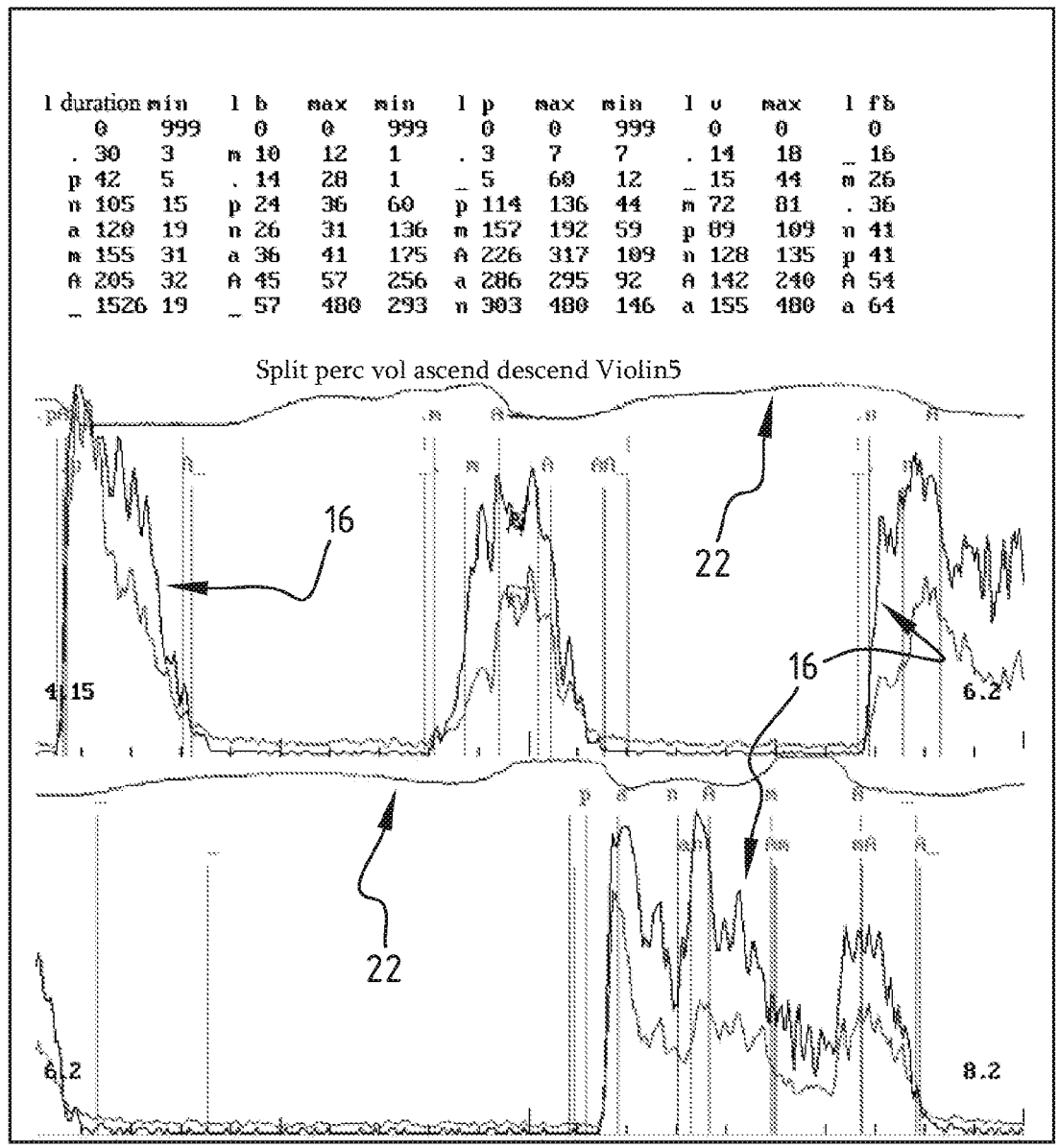
FIG. 7 shows a screenshot of a computer program with metadata as an embodiment of a method according to this disclosure.
Figure 13:
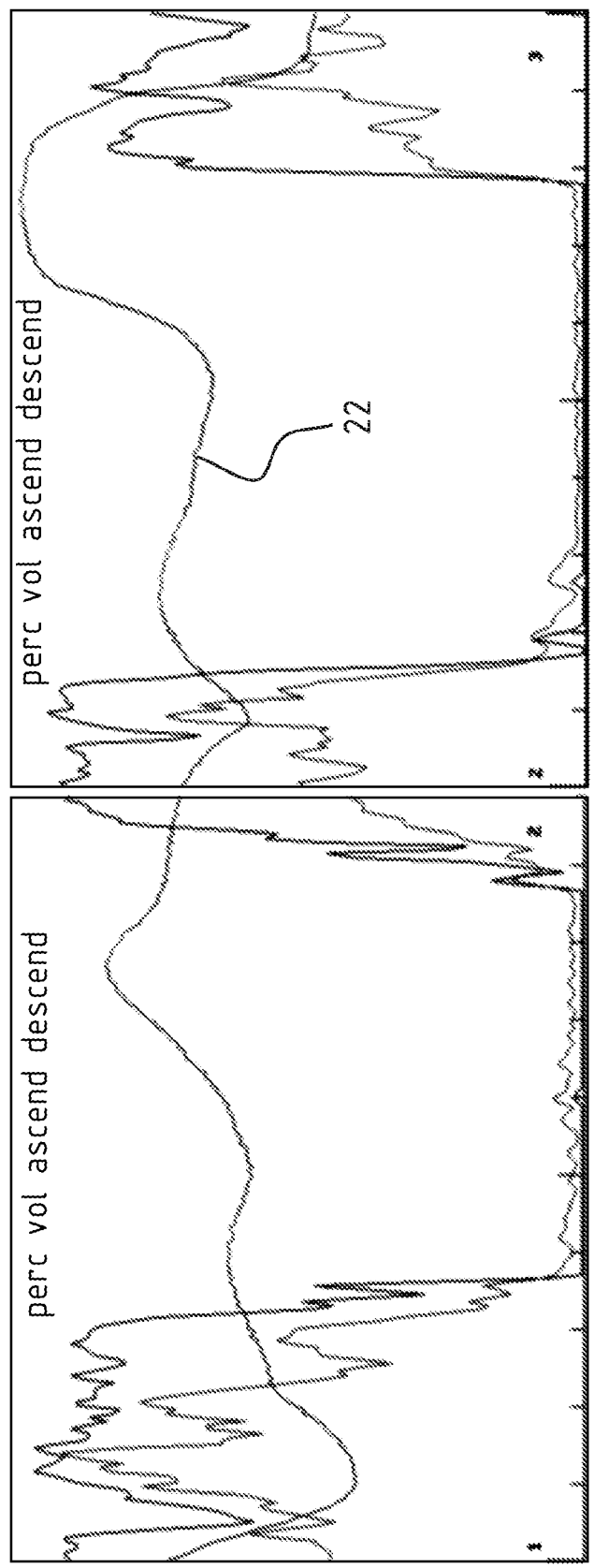
FIG. 13 shows an implementation of a method according to the present disclosure.
Figure 14:
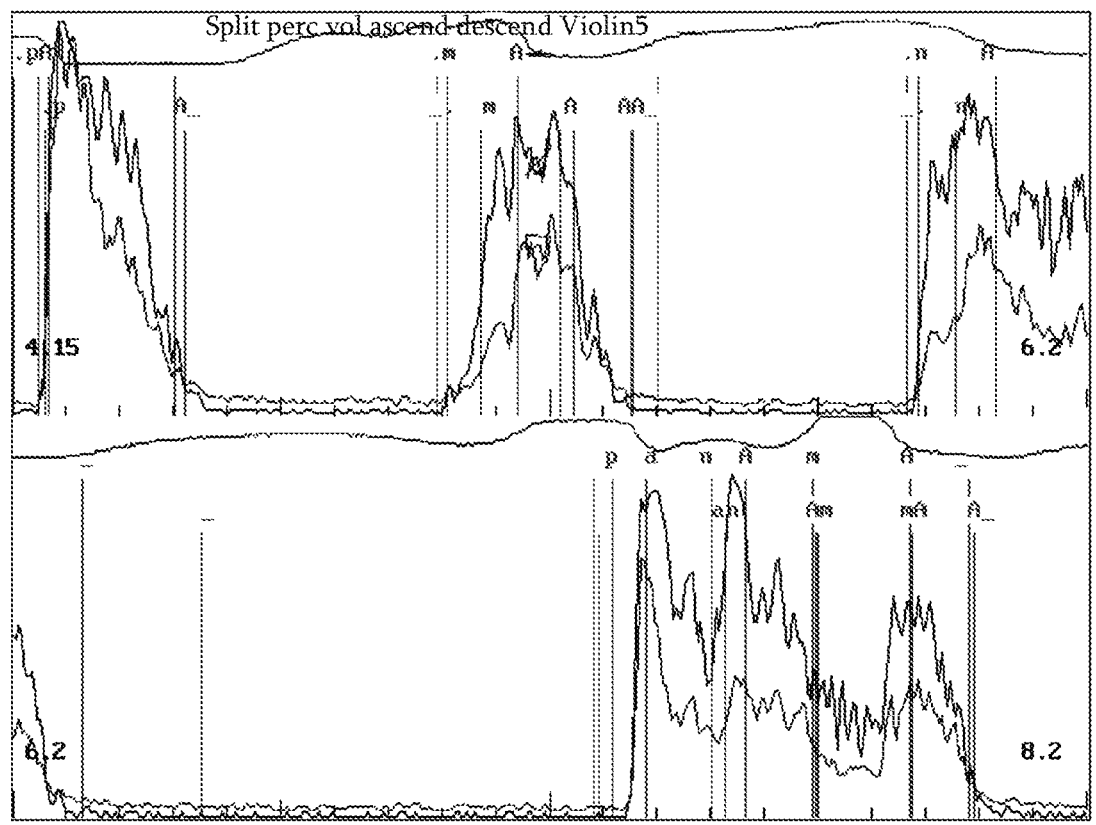
FIG. 14 shows an implementation of a method according to the present disclosure for two different people.
Figure 14:
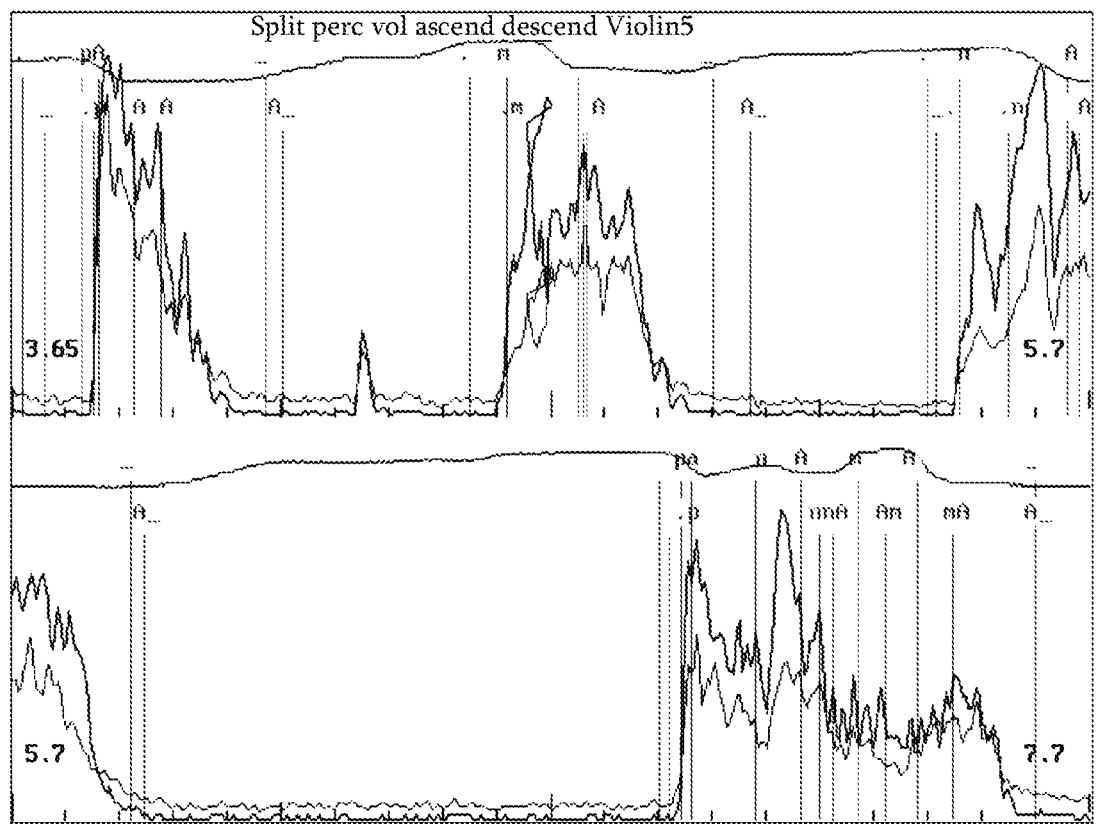

The hearing-impaired can be shown image sound, for instance with the program Violin5—see FIGS. 7 and 14. The phases of the image variable can be shown in different colours, for instance white, blue, red and green, depending also on the background colour, which represent the mouth reflection 22, as shown in FIG. 13.

Image Organ: Speech Therapy Training Program

Another application of the present disclosure is a training effect for speech therapy: stimulating so-called over-articulation. The sound of the block wave is inharmonious; this can be corrected by integrating it into a triangle, which produces a more pleasant sound. This sound, or the sound of an image organ (conversion from sawtooth to triangle through counting, see FIG. 15), provides feedback to the client of the speech therapist. An image organ converts the image signal into tuned organ tones; eight per octave, namely C octave+Bes. Such image organs with the option of integrating the block wave into a triangular form are known to the skilled person.

Image Violin: Recognition of all Spoken Languages

Speech recognition in a noisy environment can be realized for determined professions.

According to the present disclosure, speech recognition can be realized for all languages by supplementing the prior speech recognition of only the sound with reflection information from imagery.

Letter Collection: Person Recognition for Security Purposes

The speech with image, or at least with light reflection information, to be recorded according to the present disclosure is unique for each person, and almost as unique as—if not even more unique than—a fingerprint or iris scan. Consequently, highly reliable, unique recognition of a person is achieved by having the person, the speech image recognition of whom is known, read out a randomly generated sentence. A system based on the method is then trained. Person recognition is therefore based here on recognition of viseme and/or phoneme combinations instead of or in addition to database-word-analysis, and an example of an interface for this purpose is shown in FIG. 14, similar to FIG. 7 but for respectively one or two persons, with a recording example of "pA_mA_nA_panAmA" and analysed by the letter collection and Violin5. Consequently it has been made possible to combine image and speech registrations with person identification, to result in a possible double authentication and can therefore also lead to person recognition and even identification, next to recognition of phoneme and viseme combinations. In particular when phoneme recognition has been performed once (or more times) beforehand and has been laid down in a letter collection, even arbitrarily spoken or recited or even read out word combinations may lead to identification of a person.

Figure 15:
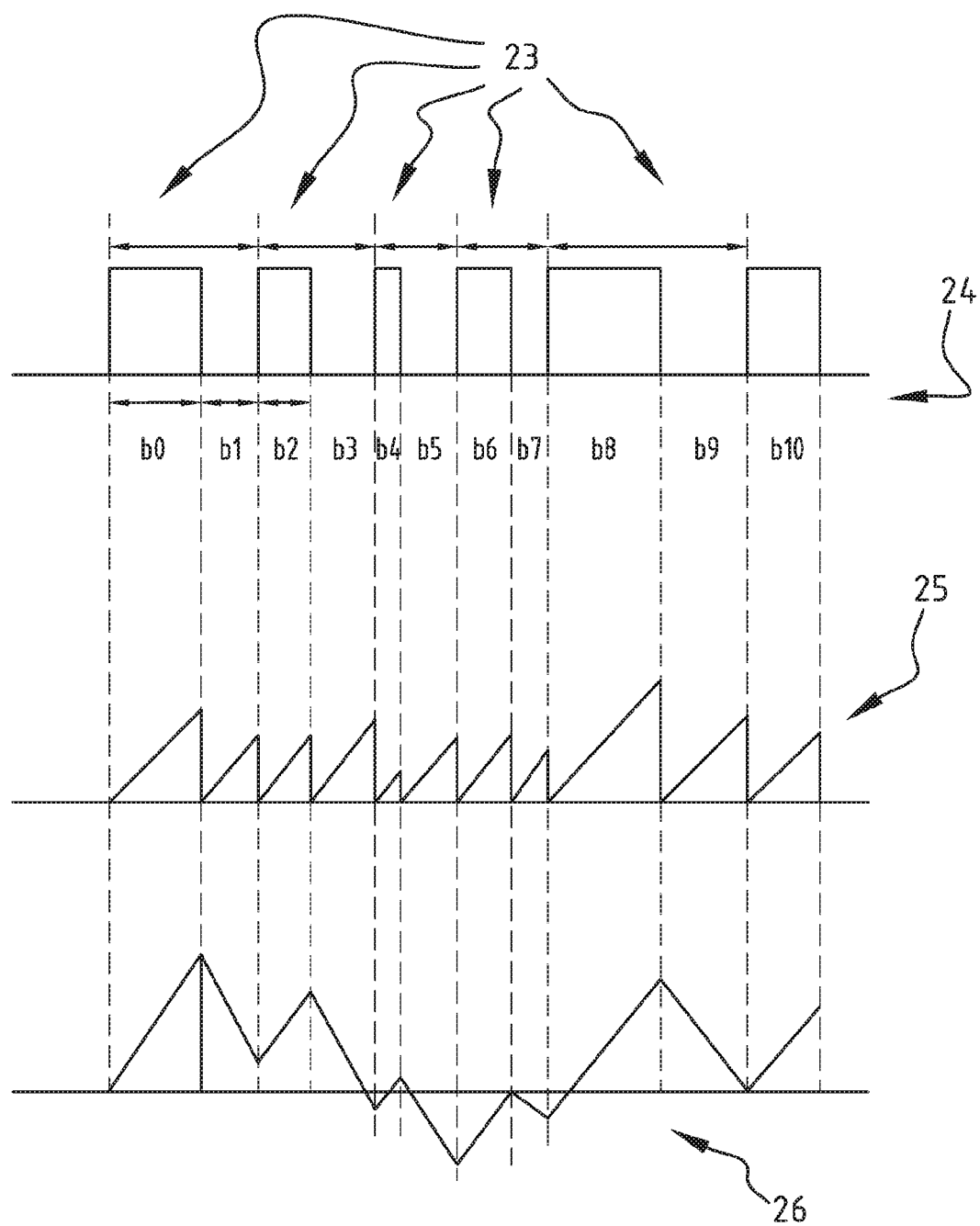
FIG. 15 shows transformation according to the present disclosure of a variable block wave into an image organ and, finally, further into an image violin.

FIG. 15 shows conversion of the variable block wave 23, which is digital at a frequency of 88.200 Hz and can be divided into different durations 24. This is converted into the image organ 25. By way of example, 30 steps, i.e. 30/88.200, b0-b 1+b2-b3, and so on, are applied here. The image violin 26, based on harmonic functions, is obtained by further conversion.

Following the foregoing disclosure of aspects, elements, features and functionalities of methods of speech recognition are claims defining the scope of protection for this disclosure, comprising at least within determined jurisdictions even obvious alternatives to aspects defined in the claims, which will make it clear that the scope of protection is in no way limited to a specific embodiment or application.

The invention claimed is:

1. A method of speech recognition, comprising:
 recording speech from a speech signal using a microphone;
 illuminating a speaking mouth;
 recording a degree of light reflected by the mouth from a reflection signal using a sensor;
 for speech recognition, in one time duration of the predetermined length of speech to be recognized:
  comparing a combination of parameters of the speech signal and of the reflection signal with pre-recorded combined parameters of a speech signal obtained during a training phase and of a reflection signal obtained during said training phase of at least some of a plurality of pre-recorded time durations, wherein said combination of parameters includes information regarding said degree of light reflected by the mouth, and wherein said pre-recorded combined parameters include information regarding said degree of light reflected by the mouth determined during said training phase;
  wherein the training speech signal and the training reflection signal are coupled to letters associated therewith per time duration; and
 deciding on the basis of the comparison to which letter the combination occurring in the speech of parameters of the speech signal and of the reflection signal corresponds,
 wherein block-width modulation is applied to the reflection signal.

2. The method of claim 1, wherein the parameter of the speech signal is taken from a group comprising within the one time duration of speech to be recognized at least:
 volume dispersion of a difference between a highest and a lowest value of a volume of the speech signal; and
 a ratio of sound of the speech signal within and outside a noise level (signal-to-noise ratio).

3. The method of claim 1, wherein the parameter of the reflection signal is taken from a group comprising within the one time duration at least:
 an average of the reflection signal; and
 a degree of increase or decrease of the reflection signal.

4. The method of claim 3, further comprising determining the average of the reflection signal as an average over the one time duration of half a block duration of a block wave used in block wave modulation.

5. The method of claim 3, further comprising determining the degree of increase or decrease of the reflection signal as a measurement in degrees.

6. The method of claim 1, wherein the time duration has a predetermined length of 1, 2, 3, 4 or 5 milliseconds.

7. The method of claim 1, further comprising subdividing the speech signal into portions corresponding to letters, and indicating at least one of:
   starting and ending times of letters in the speech signal; and
   time durations expressed in a number of times of the one time duration.

8. The method of claim 1, further comprising determining a maximum and minima of a degree of light reflected by the mouth in the reflection signal, and normalizing the reflection signal on the basis of the maximum and minima.

9. The method of claim 1, further comprising:
   forming a preselection of at least one potential subsequent letter on the basis of the decision to which letter the combination occurring in the speech of parameters of the speech signal and of the reflection signal corresponds to.

10. The method of claim 1, further comprising:
    synchronously registering speech and registering a degree of light reflected by the mouth in the reflection signal.

11. The method of claim 1, further comprising:
    person recognition based on recognition from the speech signal and the reflection signal of viseme and phoneme combinations.

* * * * *